(12) United States Patent
Zhu et al.

(10) Patent No.: US 12,410,680 B2
(45) Date of Patent: Sep. 9, 2025

(54) FLUID DENSITY VALVE, METHOD, AND SYSTEM

(71) Applicant: Baker Hughes Oilfield Operations LLC, Houston, TX (US)

(72) Inventors: Bin Zhu, Houston, TX (US); Guijun Deng, The Woodlands, TX (US); Daniel Ewing, Katy, TX (US); Zhihui Zhang, Katy, TX (US); Ronnie Russell, Cypress, TX (US); John Wakefield, Cypress, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 179 days.

(21) Appl. No.: 18/350,455

(22) Filed: Jul. 11, 2023

(65) Prior Publication Data

US 2025/0020042 A1 Jan. 16, 2025

(51) Int. Cl.
*F16K 31/36* (2006.01)
*E21B 34/08* (2006.01)
(Continued)

(52) U.S. Cl.
CPC .............. *E21B 34/10* (2013.01); *E21B 34/08* (2013.01); *F16K 31/1635* (2013.01); *F16K 31/36* (2013.01); *Y10T 137/3006* (2015.04)

(58) Field of Classification Search
CPC ...... E21B 34/10; E21B 34/08; F16K 31/1655; F16K 31/1635; F16K 31/36; F16K 31/22; F16K 33/00; Y10T 137/3006
See application file for complete search history.

(56) References Cited

U.S. PATENT DOCUMENTS

2009/0114395 A1* 5/2009 Holmes ................... E21B 34/08
166/373
2011/0266001 A1* 11/2011 Dykstra ................ E21B 34/08
166/330
(Continued)

FOREIGN PATENT DOCUMENTS

| CN | 111364951 B | 6/2022 |
| CN | 116255112 A | 6/2023 |

OTHER PUBLICATIONS

Notification of Transmittal of the International Search Report and the Written Opinion of the International Searching Authority, or the Declaration; PCT/US2024/036746/ Mail date: Oct. 22, 2024; 8 pages.

*Primary Examiner* — Kelsey E Cary
(74) *Attorney, Agent, or Firm* — Baker Hughes Patent Organization

(57) ABSTRACT

A fluid density valve housing includes a pilot fluid inlet and outlet and a primary fluid inlet and outlet. A shuttle is disposed within the housing. The shuttle comprises a portion having a reference density and a portion defining a cavity fluidically connected to the pilot fluid inlet, the shuttle permitting or denying primary fluid flow depending upon a density of a pilot fluid flowing through the cavity versus the reference density. A method for controlling flow, including comparing density of a pilot flow with a reference density, moving a valve between fully open, fully closed, and choked depending upon the differential density between the pilot fluid and the reference density. A borehole system, including a borehole in a subsurface formation, a string in the borehole, and a fluid density valve disposed within or as a part of the string.

20 Claims, 8 Drawing Sheets

(51) Int. Cl.
*E21B 34/10* (2006.01)
*F16K 31/163* (2006.01)

(56) References Cited

U.S. PATENT DOCUMENTS

| | | | |
|---|---|---|---|
| 2014/0041731 A1* | 2/2014 | Fripp | E21B 43/12 137/13 |
| 2015/0226012 A1* | 8/2015 | Zhou | E21B 33/12 175/57 |
| 2015/0240967 A1* | 8/2015 | Workman | F16K 31/30 137/429 |
| 2016/0061004 A1* | 3/2016 | Tunkiel | G05D 7/0146 166/205 |
| 2017/0044868 A1* | 2/2017 | Van Petegem | E21B 43/12 |
| 2019/0284891 A1 | 9/2019 | Da Silva et al. | |
| 2020/0157897 A1 | 5/2020 | Hered | |
| 2021/0002978 A1* | 1/2021 | Killie | E21B 43/12 |

* cited by examiner

FLUID DENSITY VALVE, METHOD, AND SYSTEM

BACKGROUND

In the resource recovery and fluid sequestration industries the flow of desirable versus undesirable fluids is paramount. Inflow control devices are known to the art and function reasonably well but rely upon viscosity of the fluid flowing therethrough to either retard or allow its passage. Sometimes viscosity is a good indicator of what will ultimately be the target fluid. Other times, viscosity is insufficient for a level of precision being sought. The art would well receive alternate technologies to improve fluid flow control.

SUMMARY

An embodiment of a fluid density valve including a housing having a pilot fluid housing inlet and outlet and a primary fluid housing inlet and outlet, and a shuttle disposed within the housing, the shuttle comprising a portion having a reference density and a portion defining a cavity fluidically connected to the pilot fluid inlet, the shuttle permitting or denying primary fluid flow depending upon a density of a pilot fluid flowing through the cavity versus the reference density.

An embodiment of an inflow control system including a viscosity-based inflow control device, and a fluid density valve, fluidly connected to the inflow control device.

An embodiment of a method for controlling a character of fluid entering a borehole including supplying a pilot fluid to a density-based valve, supplying a primary fluid to the valve, modifying a flow rate of the primary fluid through the valve based upon a density of the pilot fluid.

An embodiment of a method for controlling flow, including comparing density of a pilot flow with a reference density, moving a valve between fully open, fully closed, and choked depending upon the differential density between the pilot fluid and the reference density.

An embodiment of a borehole system, including a borehole in a subsurface formation, a string in the borehole, and a fluid density valve disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
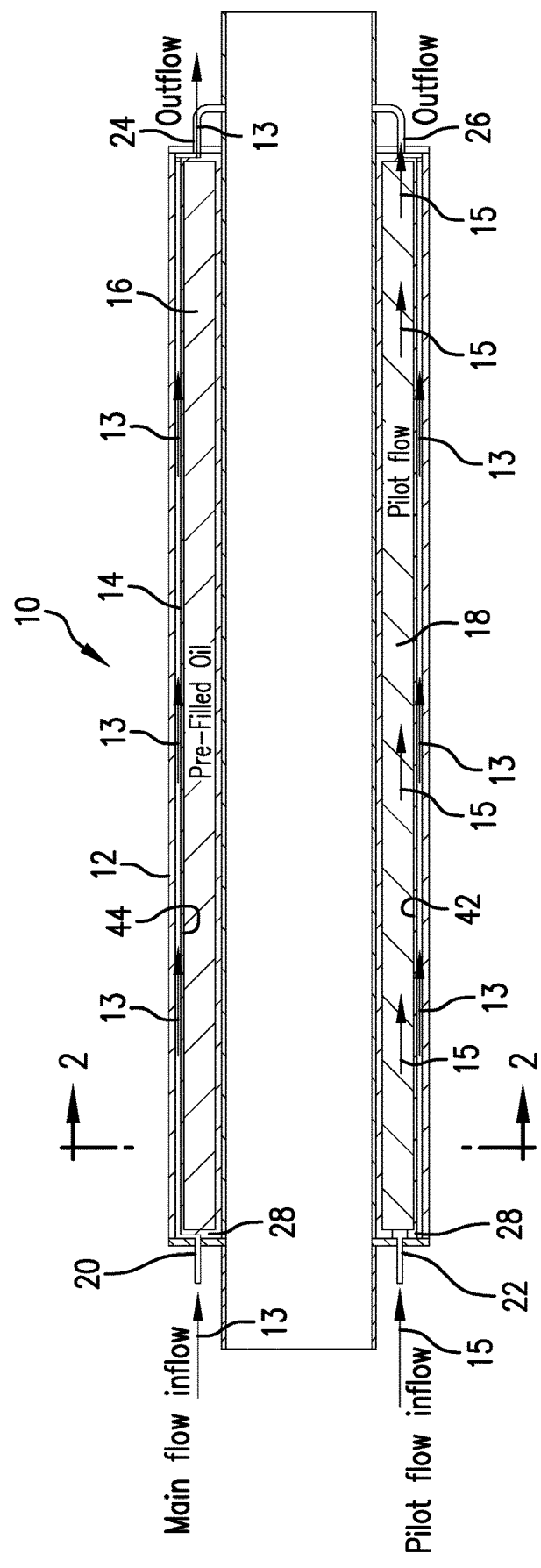
FIG. 1 is a schematic cross-sectional view of a fluid density valve as disclosed herein.

Referring to FIG. 1, a fluid density valve 10 is illustrated in cross section. Valve 10 includes a housing 12 and a shuttle 14 that is movable within the housing to modify a flow of fluid therethrough, during use, based upon a density characterization of the fluid. The characterization occurs in real time and continuously. Stated alternately, the fluid density valve as disclosed herein is not limited to a one-time closure if undesirable fluid is encountered but rather will continue to monitor the fluid moving past the valve 10 and reopen when that fluid becomes more desirable. Further, the valve 10 is not necessarily an on or off valve. It rather is configured to operate in modes of on, off, and choked in varying degrees depending upon the characterization of the entering fluid.

Figure 2:
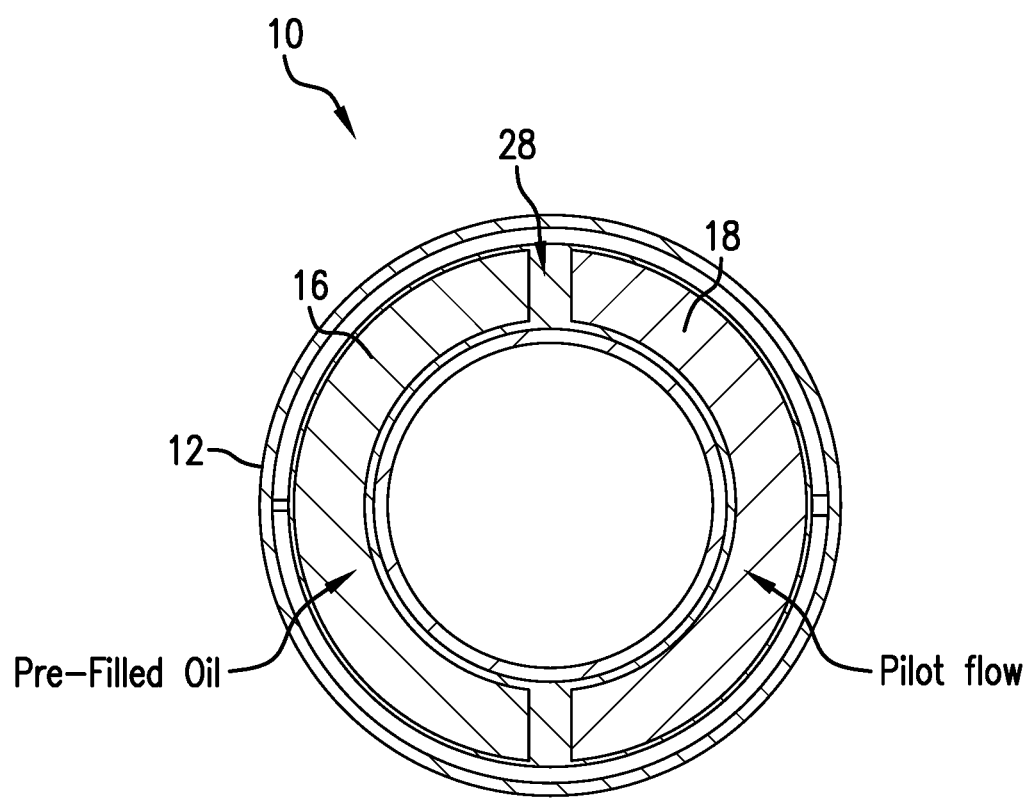
FIG. 2 is a schematic cross-sectional view of the valve of FIG. 1 taken along section line 2-2.

Referring to FIG. 2, the properties of valve 10 discussed above are realized by configuring the shuttle 14 with a reference density portion 16 and a pilot fluid portion 18. The reference density portion will provide a torque on the shuttle 14 in a direction related to whether the reference density is higher or lower than the density of fluid in the pilot portion 18.

Referring back to FIG. 1, it will be appreciated that the valve 10 includes a housing inlet 20 for a primary flow 13, a housing inlet 22 for a pilot flow 15, a housing outlet 24 for the primary flow 13, and a housing outlet 26 for the pilot flow 15. The primary flow 13 is through the housing 12 about and around the shuttle 14 in an annular space 28 that contains both the shuttle 14 and the primary fluid. The pilot flow only passes through the pilot portion 18 of the shuttle 14. The primary inlet 20 and primary outlet 24 are either fully aligned with the shuttle 14 to allow primary fluid flow through the valve 10 or misaligned where primary fluid flow through the valve is substantially stopped, or partially aligned to allow some intermediate primary fluid flow. Conversely, pilot flow through the pilot inlet 22, the pilot portion 18 and the pilot outlet 26 does not change during use of the valve 10.

Figure 3:
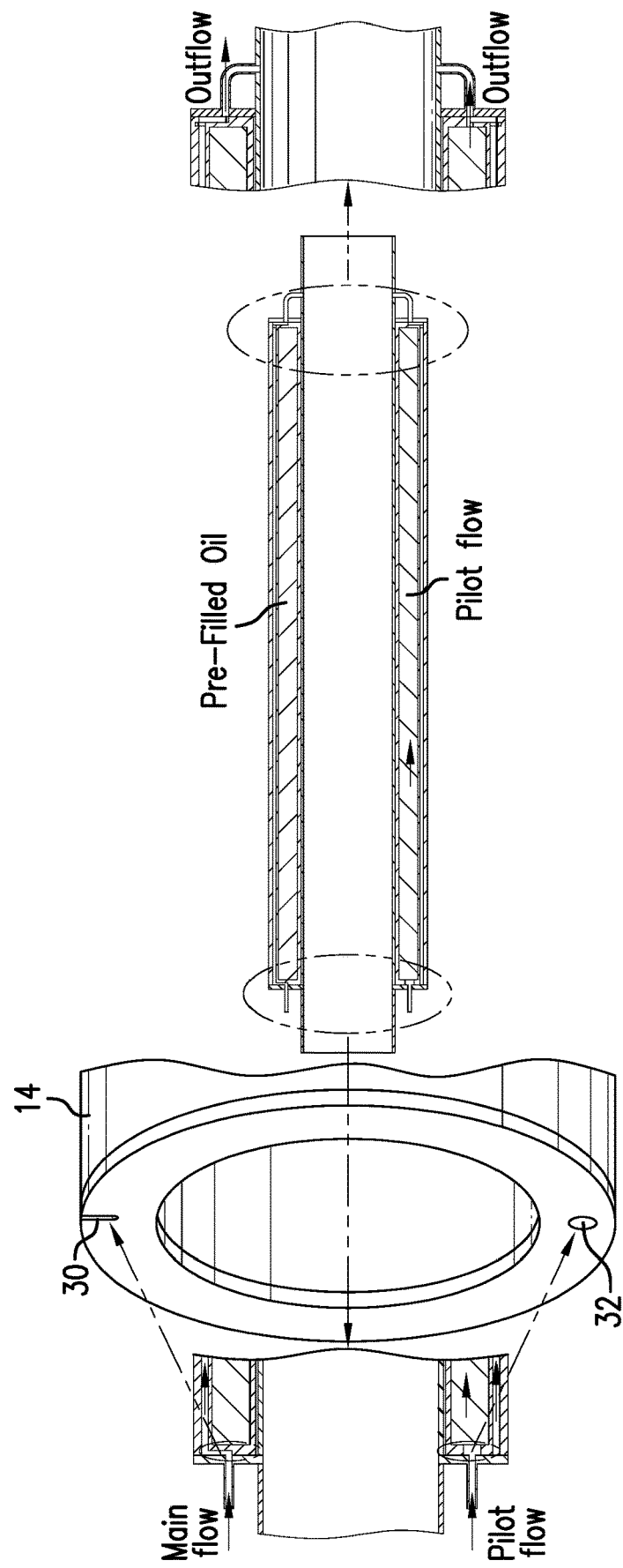
FIG. 3 is a perspective view of an inlet end of a shuttle of the valve of FIG. 1.

Referring to FIG. 3, a perspective end view of shuttle 14 that illustrates a shuttle primary flow inlet 30 and shuttle pilot flow inlet 32. It is to be appreciated that while the inlet 30 is the same circumferential (using the entire shuttle as the circumference reference) dimension as the housing primary inlet 20, the shuttle pilot inlet 32 is of larger circumferential dimension than the housing pilot inlet 22. These structural properties ensure that with rotational movement of the shuttle 14 relative to the housing 12, the primary flow path will be reduced or shut off while the pilot flow path will remain open. The larger dimensions of shuttle pilot inlet 32 than housing pilot inlet 22 ensures that they remain overlapping in all operational positions of the shuttle 14. At the same time, the housing primary inlet 20 and shuttle primary inlet 30 are the same size and hence can relatively easily be misaligned with one another to reduce or prevent the primary flow.

Figure 4:
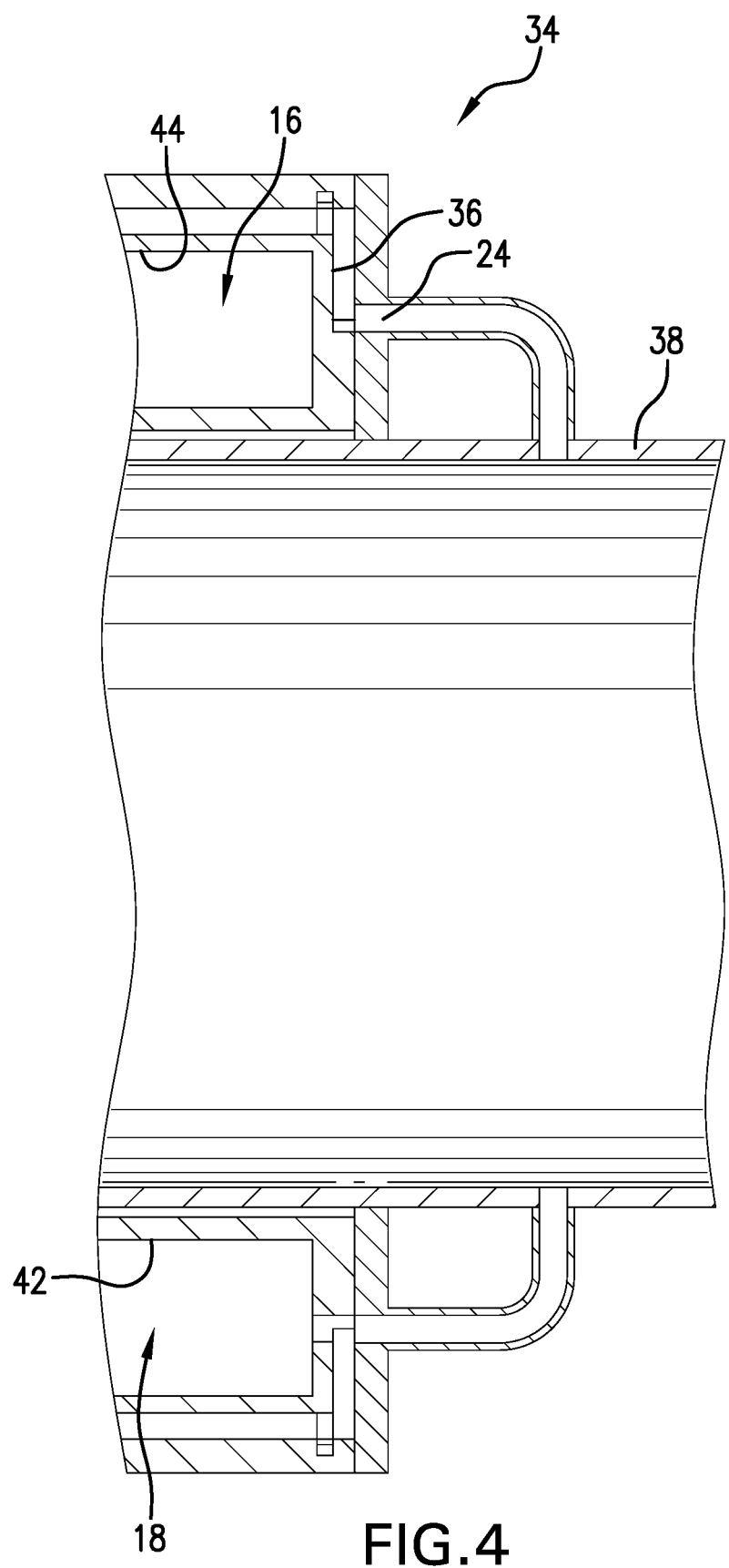
FIG. 4 is an enlarged cross-sectional view of an outlet end of the valve of FIG. 1.
Figure 5:
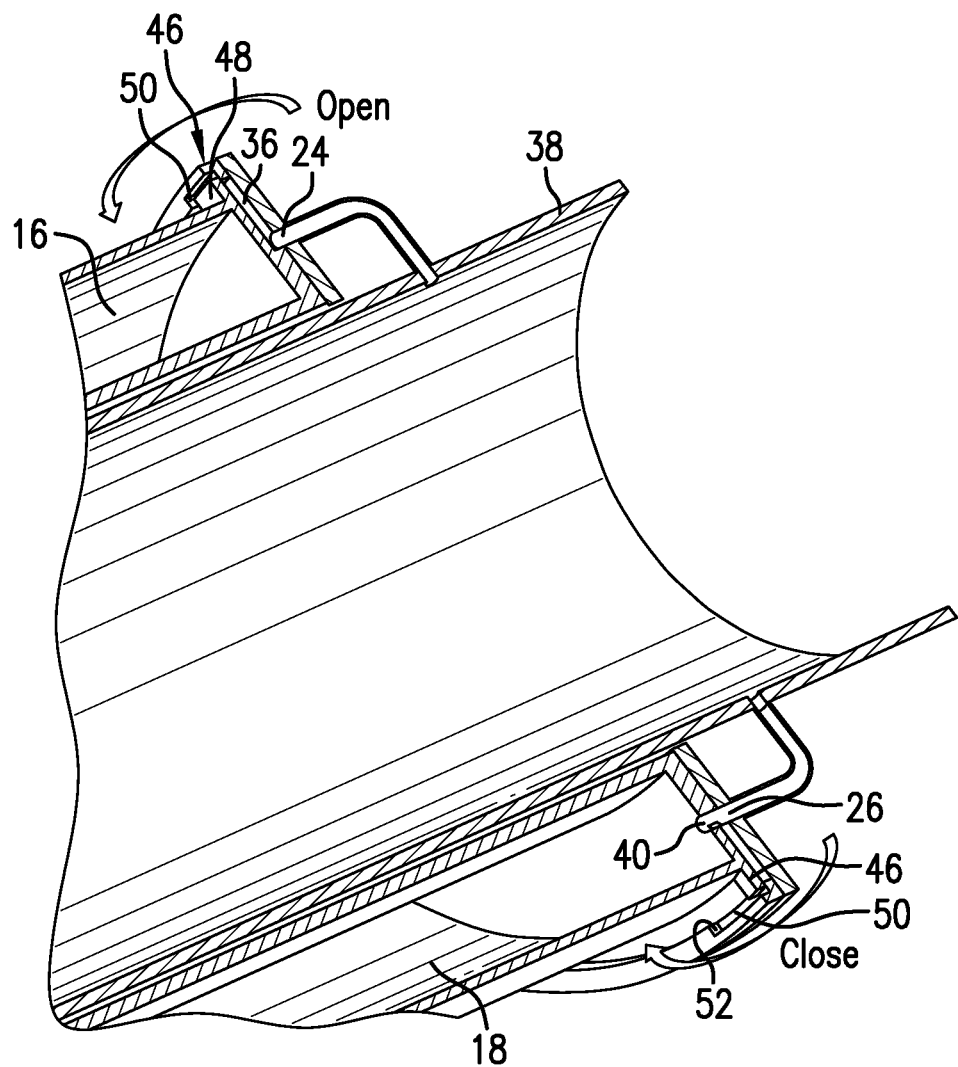
FIG. 5 is a perspective view of the same portion of the valve as illustrated in FIG. 4.

Referring to FIGS. 4 and 5 an outlet end 34 of the valve 10 is illustrated. A shuttle primary outlet 36 feeds through the housing primary outlet 24 to an inside dimension (ID) flow path in a mandrel 38 upon which the valve 10 is mounted. Hence, in one embodiment, the valve 10 will distinguish target oil for inflow to the ID of mandrel 38 and add that oil to production. Similar to the FIG. 3 view, the shuttle primary outlet 36 is aligned with the housing primary outlet 24 to allow the primary flow path to flow and misaligned to a degree or completely to restrict the primary flow. The housing pilot outlet 26 is always overlapping a shuttle pilot outlet 40 to ensure that the pilot flow is always flowing through portion 18, during use.

As illustrated the shuttle 14 is a rotary member that moves, for example rotates, only a small amount one way or the other to either align, misalign or partially align the inlets and outlets of the housing and shuttle with each other to permit a primary fluid flow. The movement of the shuttle is mediated by the reference density portion 16 versus the pilot fluid flowing through a pilot cavity 42. The density of reference density portion 16 will be similar to a target fluid regardless of what that fluid is. Water and oil are specifically described herein but the disclosure is not limited to these two fluids. Rather it is adaptable to work with any fluids having differing density, one from the other. The portion 16, which may comprise a cavity 44 filled with a substance having a selected density to cause the valve 10 to take a desired action or may just be made of a material having the reference density, such as a solid material (foamed material, particulate material or one or several larger pieces of material) or a fluid (solid-based, gas-based, or liquid-based) that is lower density than water or a different unwanted fluid. The material may be any type of organic or inorganic material as it is used only for its density and does not need to interact with any other materials, In one embodiment having the cavity 44, for example, the cavity 44 may be filled with an oil that has a similar density to a target hydrocarbon so that the valve will remain open and admit that hydrocarbon, while if water breaks through with a higher density than the reference portion 16, the valve 10 would close. The cavity 42 of the pilot portion 18 is fed the same entering fluid and is used to weigh against the reference portion 16. The water or oil being produced in the last example will be flowing through the portion 18. Depending upon the density of that flow versus the density of the portion 16, the primary flow may be allowed to flow or not. The valve 10 is fully reversible depending upon what fluid is being run through the pilot portion 18. If the fluid becomes more desirable, the valve 10 will open more; if the fluid become less desirable the valve will close more.

In embodiments, the housing 12 and shuttle 14 will have an interface 46 to prevent movement beyond what is necessary for the valve 10 to function. This may be, for example a tab 48 extending from the housing or the shuttle toward the other of the housing or the shuttle and a defined recess 50 to receive that tab 48 so that only so much movement is permitted before the tab 48 strikes a shoulder 52 of the recess 50.

Figure 6:
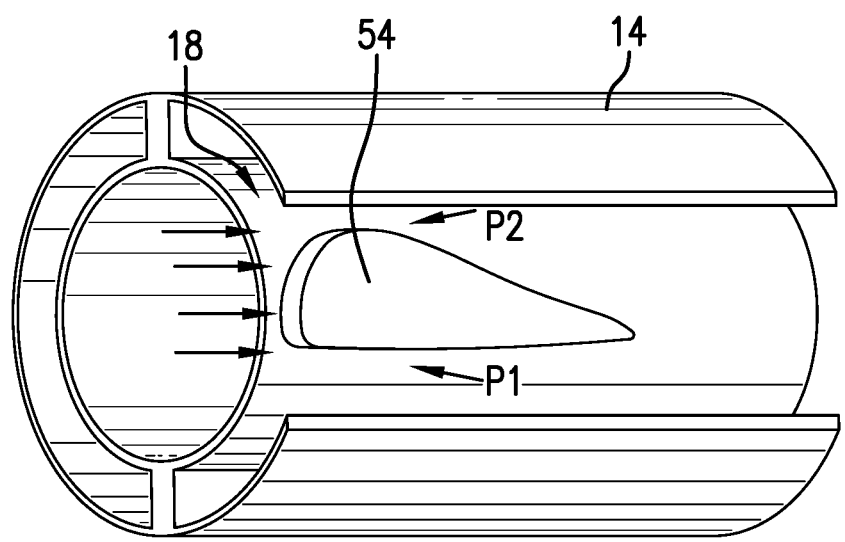
FIG. 6 is a partial transparent view of an alternate embodiment that employs hydrodynamic force to move the shuttle.

The above-described features rely solely on the differential density of the reference portion 16 to the pilot portion 18 to move the shuttle 14. In other embodiments however, referring to FIGS. 6 and 7, movement of the shuttle 14 is augmented using a hydrodynamic force. The shuttle 14 includes in the pilot portion 18 a profile 54 (see FIG. 6) or multiple profiles 54 (see FIG. 7), such as an airfoil shape, that creates differential fluid pressure on one side versus the other side and accordingly imparts a torque to the shuttle 14 when fluid flows over the shape, as will always be the case with the profile 54 in the pilot portion 18 of shuttle 14. The greater the density of the fluid flowing over the profile(s) 54, the greater the torque generated.

In some systems, the valve 10 is used in conjunction with a viscosity-based inflow control device such as for example an EQUALIZER™ inflow control device commercially available from Baker Hughes.

Figure 7:
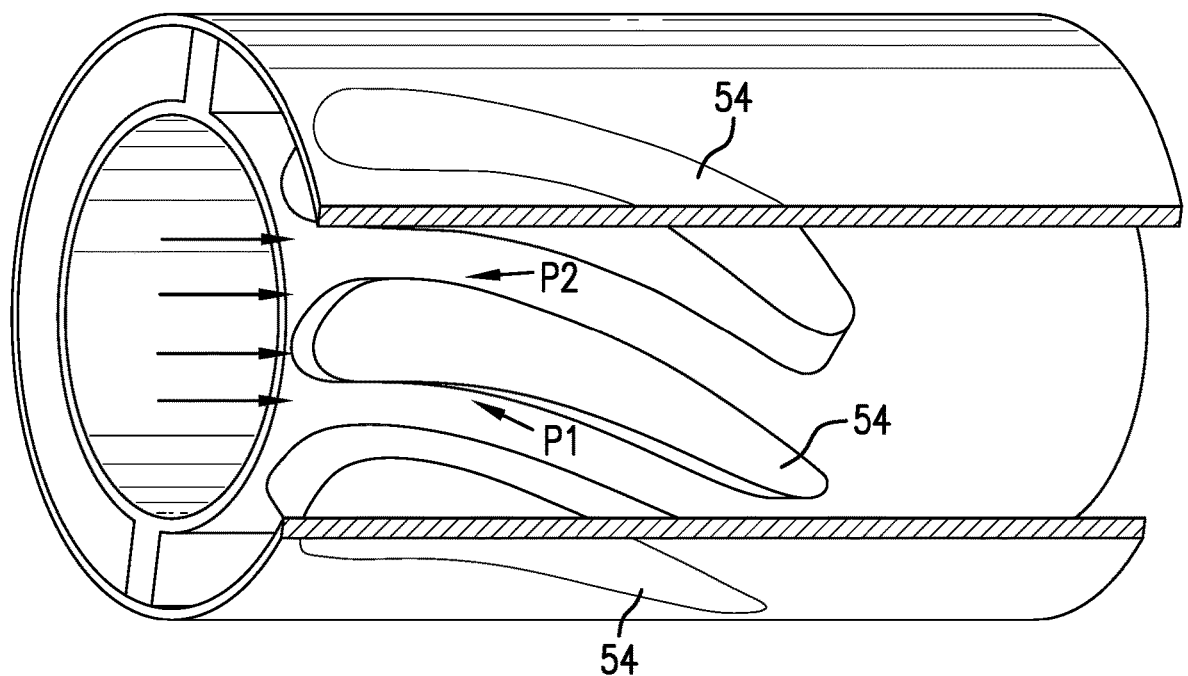
FIG. 7 is a partial transparent view of another alternate embodiment that still uses hydrodynamic force.
Figure 8:
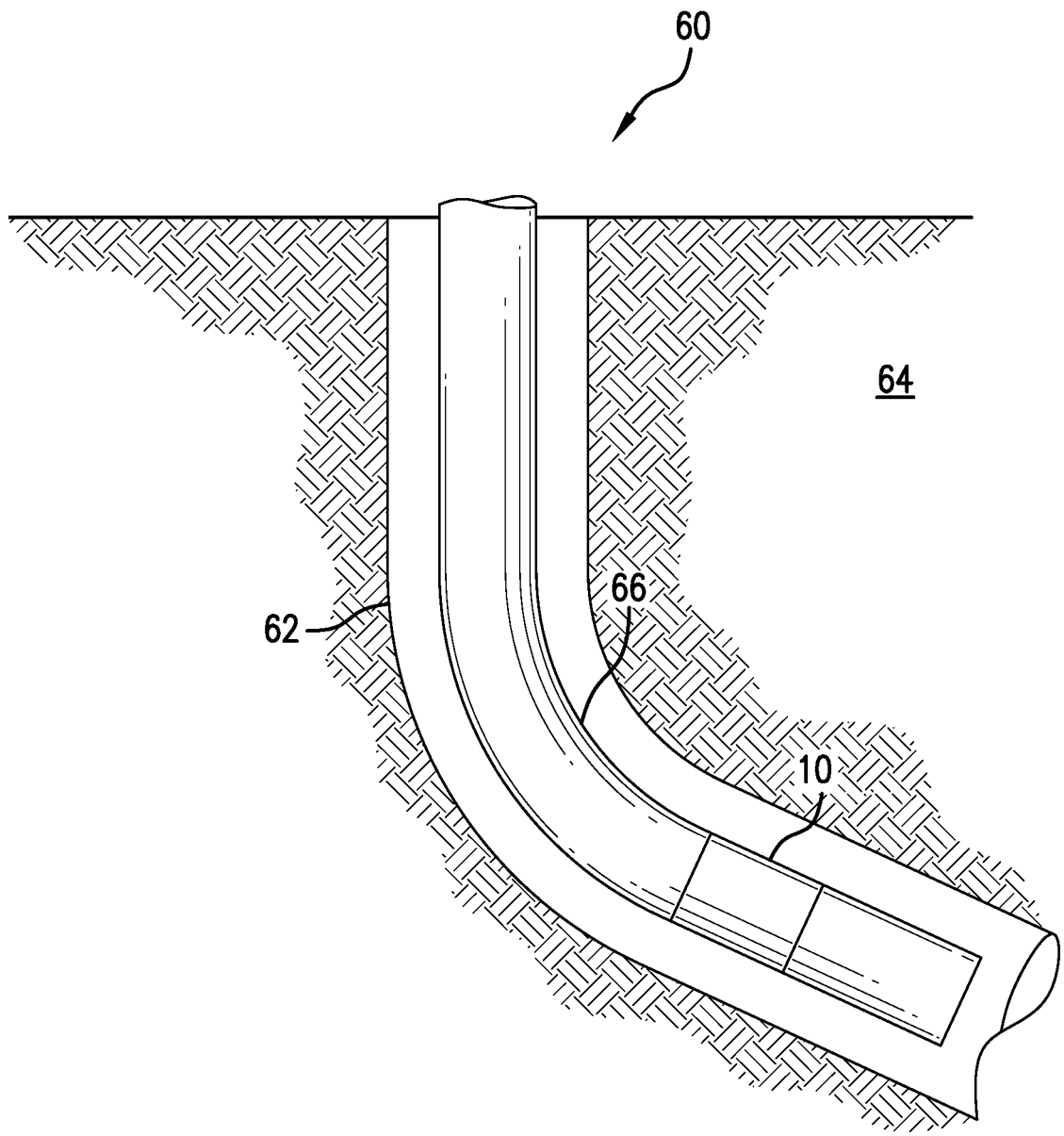
FIG. 8 is a view of a borehole system including the fluid density valve as disclosed herein.

Referring to FIG. 7, a borehole system 60 is illustrated. The system 60 comprises a borehole 62 in a subsurface formation 64. A string 66 is disposed within the borehole 62. A valve 10 is disposed within or as a part of the string 66. Set Forth Below are Some Embodiments of the Foregoing Disclosure:

Embodiment 1: A fluid density valve including a housing having a pilot fluid housing inlet and outlet and a primary fluid housing inlet and outlet, and a shuttle disposed within the housing, the shuttle comprising a portion having a reference density and a portion defining a cavity fluidically connected to the pilot fluid inlet, the shuttle permitting or denying primary fluid flow depending upon a density of a pilot fluid flowing through the cavity versus the reference density.

Embodiment 2: The valve as in any prior embodiment, wherein the shuttle is movable rotationally.

Embodiment 3: The valve as in any prior embodiment, wherein the cavity includes a profile therein that creates a hydrodynamic effect on the shuttle when fluid flows past the profile.

Embodiment 4: The valve as in any prior embodiment, wherein the profile is a plurality of profiles.

Embodiment 5: The valve as in any prior embodiment, wherein the primary fluid inlet, outlet, or both the primary fluid inlet and outlet are misalignable with the shuttle, thereby inhibiting primary fluid flow through the housing.

Embodiment 6: The valve as in any prior embodiment, wherein the shuttle includes a pilot fluid cavity inlet.

Embodiment 7: The valve as in any prior embodiment, wherein the pilot fluid housing inlet is dimensioned and configured to remain fluidly aligned with the cavity pilot fluid inlet regardless of shuttle position.

Embodiment 8: The valve as in any prior embodiment, wherein the portion having a reference density is a cavity filled with a material of known density.

Embodiment 9: The valve as in any prior embodiment, wherein the fluid of known density is an oil.

Embodiment 10: The valve as in any prior embodiment, wherein the shuttle and housing include an interface that limits movement of the shuttle.

Embodiment 11: An inflow control system including a viscosity-based inflow control device, and a fluid density valve as in any prior embodiment, fluidly connected to the inflow control device.

Embodiment 12: A method for controlling a character of fluid entering a borehole including supplying a pilot fluid to a density-based valve, supplying a primary fluid to the valve, modifying a flow rate of the primary fluid through the valve based upon a density of the pilot fluid.

Embodiment 13: The method as in any prior embodiment, further including filling a cavity of the density-based valve with a reference density material.

Embodiment 14: The method as in any prior embodiment, further including moving a shuttle of the valve between positions allowing primary fluid flow and restricting primary fluid flow based upon the density of the pilot fluid.

Embodiment 15: The method as in any prior embodiment, wherein the moving further includes a hydrodynamic input from the flowing of the pilot fluid.

Embodiment 16: The method as in any prior embodiment, including maintaining pilot fluid flow through the valve both when primary fluid flow is permitted and when primary fluid flow is restricted.

Embodiment 17: The method as in any prior embodiment, further comprising reversing the modifying based upon a change in the density of the pilot fluid.

Embodiment 18: A method for controlling flow, including comparing density of a pilot flow with a reference density, moving a valve between fully open, fully closed, and choked depending upon the differential density between the pilot fluid and the reference density.

Embodiment 19: The method as in any prior embodiment wherein the moving is reversible upon a change in the pilot fluid density.

Embodiment 20: A borehole system, including a borehole in a subsurface formation, a string in the borehole, and a fluid density valve as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A fluid density valve comprising:
a housing having a pilot fluid housing inlet and outlet and a primary fluid housing inlet and outlet; and
a shuttle disposed within the housing, the shuttle comprising a portion having a reference density and a portion defining a cavity fluidically connected to the pilot fluid inlet, the shuttle permitting or denying primary fluid flow depending upon a density of a pilot fluid flowing through the cavity versus the reference density.

2. The valve as claimed in claim 1, wherein the shuttle is movable rotationally.

3. The valve as claimed in claim 1, wherein the cavity includes a profile therein that creates a hydrodynamic effect on the shuttle when fluid flows past the profile.

4. The valve as claimed in claim 3, wherein the profile is a plurality of profiles.

5. The valve as claimed in claim 1, wherein the primary fluid inlet, outlet, or both the primary fluid inlet and outlet are misalignable with the shuttle, thereby inhibiting primary fluid flow through the housing.

6. The valve as claimed in claim 1, wherein the shuttle includes a pilot fluid cavity inlet.

7. The valve as claimed in claim 6, wherein the pilot fluid housing inlet is dimensioned and configured to remain fluidly aligned with the cavity pilot fluid inlet regardless of shuttle position.

8. The valve as claimed in claim 1, wherein the portion having a reference density is a cavity filled with a material of known density.

9. The valve as claimed in claim 8, wherein the fluid of known density is an oil.

10. The valve as claimed in claim 1, wherein the shuttle and housing include an interface that limits movement of the shuttle.

11. An inflow control system comprising:
a viscosity-based inflow control device; and
a fluid density valve as claimed in claim 1, fluidly connected to the inflow control device.

12. A method for controlling a character of fluid entering a borehole comprising:
supplying a pilot fluid to a density-based valve;
supplying a primary fluid to the density-based valve;
modifying a flow rate of the primary fluid through the density-based valve based upon a density of the pilot fluid.

13. The method as claimed in claim 12, further including filling a cavity of the density-based valve with a reference density material.

14. The method as claimed in claim 12, further including moving a shuttle of the density-based valve between positions allowing primary fluid flow and restricting primary fluid flow based upon the density of the pilot fluid.

15. The method as claimed in claim 14, wherein the moving further includes a hydrodynamic input from the flowing of the pilot fluid.

16. The method as claimed in claim 12, including maintaining pilot fluid flow through the density-based valve both when primary fluid flow is permitted and when primary fluid flow is restricted.

17. The method as claimed in claim 12, further comprising reversing the modifying based upon a change in the density of the pilot fluid.

18. A method for controlling flow using the fluid density valve claimed in claim 1, comprising:
comparing density of a pilot flow with a reference density;
moving the fluid density valve between fully open, fully closed, and choked depending upon the differential density between the pilot fluid and the reference density.

19. The method as claimed in claim 18 wherein the moving is reversible upon a change in the pilot fluid density.

20. A borehole system, comprising:
a borehole in a subsurface formation;

a string in the borehole; and a fluid density valve as claimed in claim 1 disposed within or as a part of the string.

\* \* \* \* \*